US007806015B2

United States Patent
Berg et al.

(10) Patent No.: US 7,806,015 B2
(45) Date of Patent: Oct. 5, 2010

(54) CONTROL SYSTEM AND METHOD FOR A VEHICLE TRANSMISSION

(75) Inventors: Frederick J. Berg, Auburn, MI (US); Scott A. Scherzer, Linwood, MI (US); Kenneth G. Johnston, Freeland, MI (US); David C. Leece, Bay City, MI (US); Timothy J. Bennett, Kawkawlin, MI (US); Philip L. Wasalaski, Bay City, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 321 days.

(21) Appl. No.: 12/120,716

(22) Filed: May 15, 2008

(65) Prior Publication Data
US 2009/0195375 A1 Aug. 6, 2009

Related U.S. Application Data

(63) Continuation-in-part of application No. 12/023,602, filed on Jan. 31, 2008, now abandoned.

(51) Int. Cl.
*F16H 59/00* (2006.01)
(52) U.S. Cl. ........................................................ 74/335
(58) Field of Classification Search .................. 74/335; 340/456
See application file for complete search history.

(56) References Cited

U.S. PATENT DOCUMENTS

| 4,463,427 | A | * | 7/1984 | Bonnetain et al. | 701/123 |
|---|---|---|---|---|---|
| 4,800,360 | A | * | 1/1989 | Dunkley et al. | 340/456 |
| 5,017,916 | A | * | 5/1991 | Londt et al. | 340/870.13 |
| RE34,064 | E |   | 9/1992 | Tury |   |
| 5,675,315 | A | * | 10/1997 | Issa et al. | 340/456 |
| 5,706,197 | A | * | 1/1998 | Stasik et al. | 701/52 |
| 6,046,673 | A | * | 4/2000 | Michael et al. | 340/456 |
| 6,459,368 | B1 | * | 10/2002 | Miller et al. | 340/456 |
| 7,406,889 | B2 | * | 8/2008 | Okawa | 74/335 |
| 7,458,917 | B2 | * | 12/2008 | Yoshikawa et al. | 477/115 |
| 2006/0005646 | A1 |   | 1/2006 | Riefe et al. |   |

* cited by examiner

*Primary Examiner*—Dirk Wright
(74) *Attorney, Agent, or Firm*—Cantor Colburn LLP

(57) ABSTRACT

A control system for a vehicle transmission implements a method of controlling the transmission. The system includes a device for selecting the desired operating mode of the transmission, such as a gear shift lever, and a transmission sensor for sensing the actual operating mode of the transmission. A display is in communication with the device and the transmission sensor and displays both the desired operating mode and the actual operating mode of the transmission. A controller is in communication with the transmission and controls the operating mode of the transmission. An occupancy sensor, in communication with the controller, verifies that the driver is in the driver seat before the controller allows the transmission to be shifted out of a park mode.

17 Claims, 5 Drawing Sheets

CONTROL SYSTEM AND METHOD FOR A VEHICLE TRANSMISSION

CROSS-REFERENCE TO RELATED APPLICATIONS

This is a continuation-in-part application of application Ser. No. 12/023,602, filed Jan. 31, 2008, which is hereby incorporated by reference.

BACKGROUND OF THE INVENTION

1. Field of the Invention

The subject invention relates generally to systems and methods for controlling a transmission of a vehicle.

2. Description of the Prior Art

Various systems and methods for controlling a transmission of a vehicle are known in the prior art. Modern transmission systems typically include microprocessor-based controllers that receive inputs from a variety of switches of sensors and provide outputs that control the transmission accordingly. For instance, a controller may accept inputs from a shift lever which is operated by the driver of the vehicle to correspond to the desired operating mode of the transmission (e.g., Park, Reverse, Neutral, Drive, etc.) and a speed sensor which senses the speed of the vehicle. The controller may then change the operating mode of the transmission based on the input from the shift lever and the speed sensor. Therefore, the controller can prevent damage to the transmission, for example, by preventing a shift in the transmission from "Drive" to "Reverse" while moving forward at a high rate of speed.

Typically, an indicator is mechanically interlocked with the shift lever to show the desired operating mode. However, in systems such as described above, a driver may interpret the indicator as the actual operating mode of the transmission, leading to driver confusion. Therefore, there remains a need for a system and method for controlling a transmission that relays accurate transmission operating mode information to the driver of the vehicle.

SUMMARY OF THE INVENTION AND ADVANTAGES

The subject invention includes a method of relaying transmission information to a driver of a vehicle. The method includes the step of receiving an input from a driver corresponding to a desired operating mode of the transmission. The method also includes the step of sensing an actual operating mode of the transmission. The method further includes the step of displaying both the desired operating mode and actual operating mode of the transmission to the driver of the vehicle.

The subject invention also includes a system for operating a transmission of a vehicle. The system includes an transmission selector device for receiving an input from a driver corresponding to a desired operating mode of the transmission. A sensor is operatively connected to the transmission for sensing an actual operating mode of the transmission. A display is in communication with the input device and the sensor for displaying both the desired gear and the actual operating gear of the transmission to the driver.

The subject invention further includes a system for controlling an operating mode of a transmission of a vehicle. The transmission includes a plurality of operating modes including a park mode and at least one drive mode. The system includes a transmission selector device for receiving an input from a driver corresponding to a desired operating mode of the transmission. An occupancy sensor is operatively connected to a driver's seat of the vehicle for sensing a presence of a driver in the driver's seat. The system also includes a controller having at least one input electrically connected to the input device and the sensor for receiving a selector signal from the transmission selector device which corresponds to the desired operating mode of the transmission and a occupancy sensor signal from the occupancy sensor which corresponds to the presence of the driver in the driver's seat. The controller determines an appropriate operating mode of the transmission based at least in part on the input device signal and the occupancy sensor signal. The controller also includes at least one output electrically connected to the transmission for sending an output signal corresponding to the appropriate operating mode of the transmission as determined by the controller.

The subject invention further includes a method of controlling an operating mode of a transmission of a vehicle. The transmission includes a plurality of operating modes including a park mode and at least one drive mode. The method includes the step of receiving an input from a driver of the vehicle corresponding to a desired operating mode of the transmission. A presence of a driver in a driver's seat of the vehicle is sensed. An appropriate operating mode of the transmission is determined based at least in part on both the input from the driver and the presence of the driver in the driver's seat. The method also includes the step of sending the appropriate operating mode of the transmission to the transmission.

Numerous advantages are provided by the subject invention. By allowing the driver (or other occupant) of the vehicle to see both the desired and actual operating modes of the transmission, the driver will recognize important information about the transmission. For example, the driver need not simply assume, for example, a shift to a lower gear has taken place and therefore will not have false reliance on that assumption. The subject invention also prevents the transmission from shifting out of the park mode without the driver. This can eliminate the need for a brake interlock that is commonly used in modern automatic transmission and/or enhance the protection of the vehicle from unwanted transmission shifts.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, the subject invention provides a system 10 and method for controlling a transmission 12 of a vehicle 14.

The transmission 12 of the vehicle 14 is preferably a fully automatic transmission as is well known to those skilled in the art for providing drive-engagement and gear ratio selection with almost no input from a driver of the vehicle 14. Alternatively, the transmission may be a semi-automatic transmission, a continuously-variable transmission (CVT), a manual transmission, or other style of transmission known to those skilled in the art. Automatic transmissions typically include several operating modes. These operating modes may include a park mode in which the transmission inhibits movement of the wheels of the vehicle, a neutral mode in which the wheels are disconnected from the engine but permits rotation of the wheels, a reverse mode in which the wheels are operatively connected to the engine and in which the transmission drives the wheels in a reverse direction, and a drive mode in which the wheels are operatively connected to the engine and in which the transmission drives the wheels in a forward direction, and one or more specific gear modes in which a specific gear of the transmission is selected for forward driving.

Figure 1:
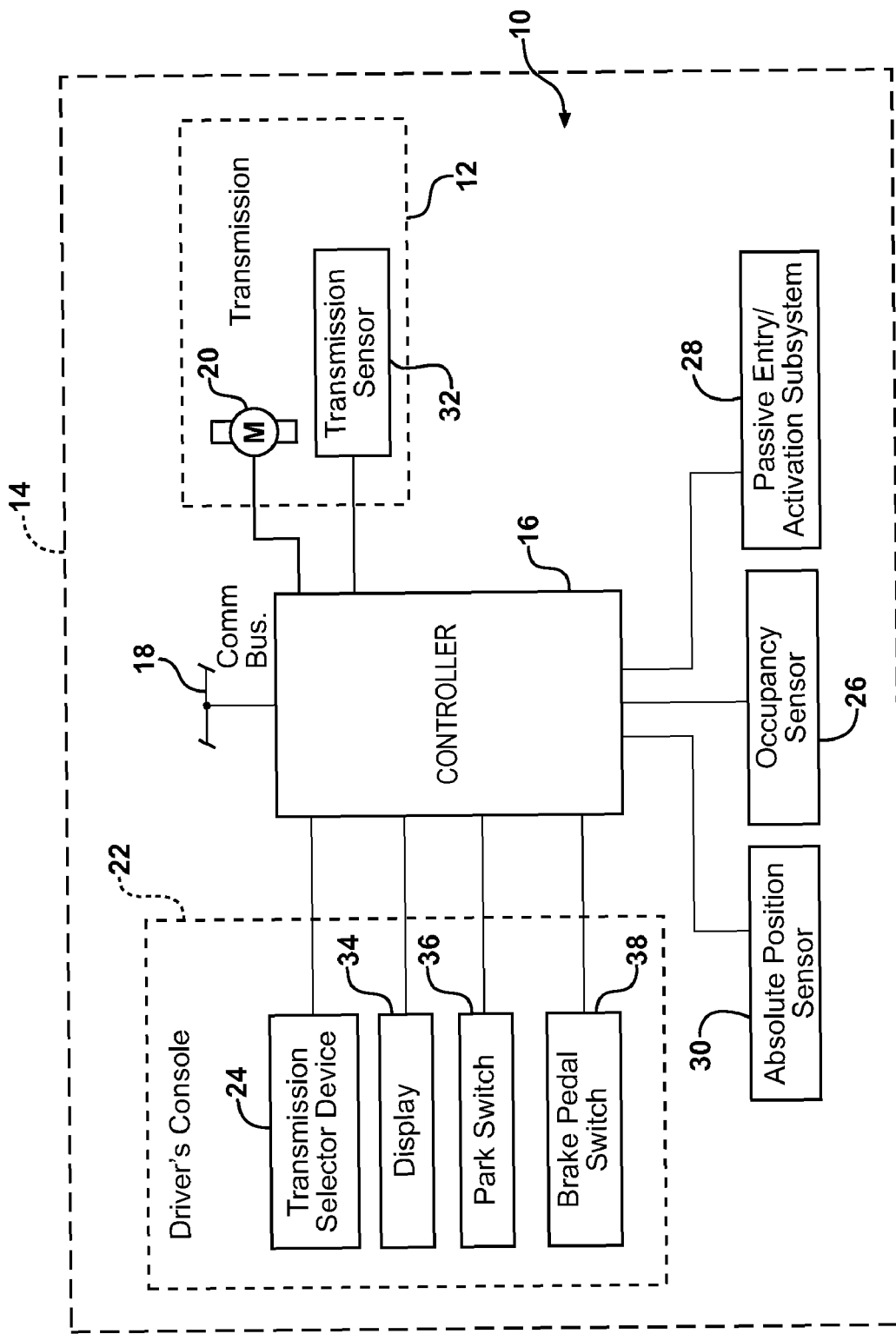
FIG. 1 is a block diagram showing a system of the present invention.

In a preferred embodiment, as shown in FIG. 1, the system 10 includes a controller 16. The controller 16 preferably includes at least one microprocessor-based device as is well known to those skilled in the art. Of course, the controller 16 may be implemented with a plurality of microprocessors, microcontrollers, and/or other logic circuits in communication with one another. Those skilled in the art realize other alternative techniques to implement the functionality of the controller 16 as further described herein.

The controller 16 preferably includes at least one input (not numbered) for receiving signals and at least one output (not numbered) for transmitting signals. Those skilled in the art realize numerous techniques for implementing the inputs and outputs of the controller 16, including, but not limited to, a communications bus 18. The communications bus 18 may also be in communication with other vehicle systems and subsystems.

The system 10 preferably includes a shifter motor 20 operatively connected to the transmission 12 for changing the operating mode and selecting the operating gear of the transmission 12. The shifter motor 20 is electrically connected to one of the outputs of the controller 16, i.e., the shifter motor 20 is in communication with the controller 16.

Figure 2:
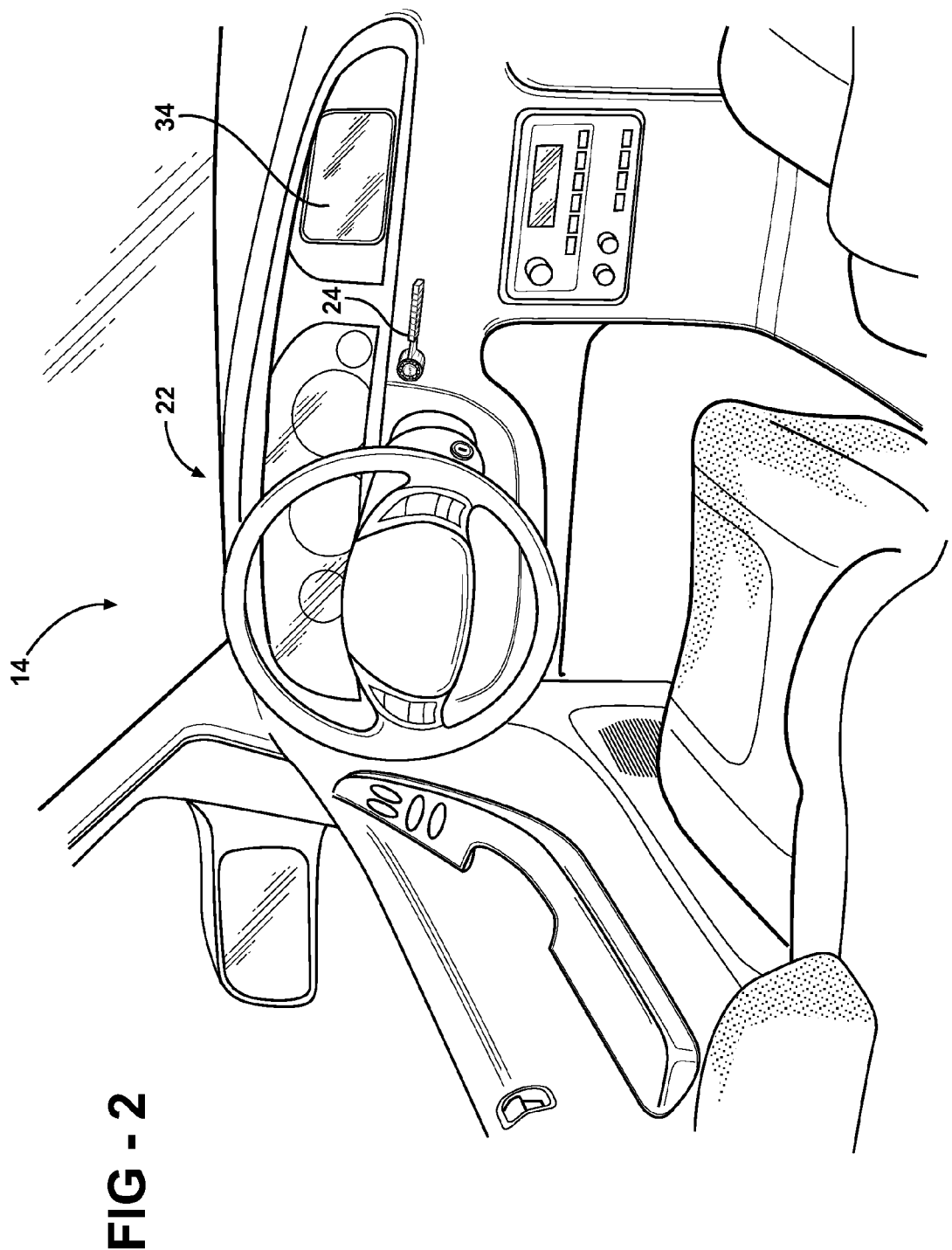
FIG. 2 is a perspective view of a driver's console of a vehicle showing a transmission selector device mounted on a dashboard and a display.
Figure 3:
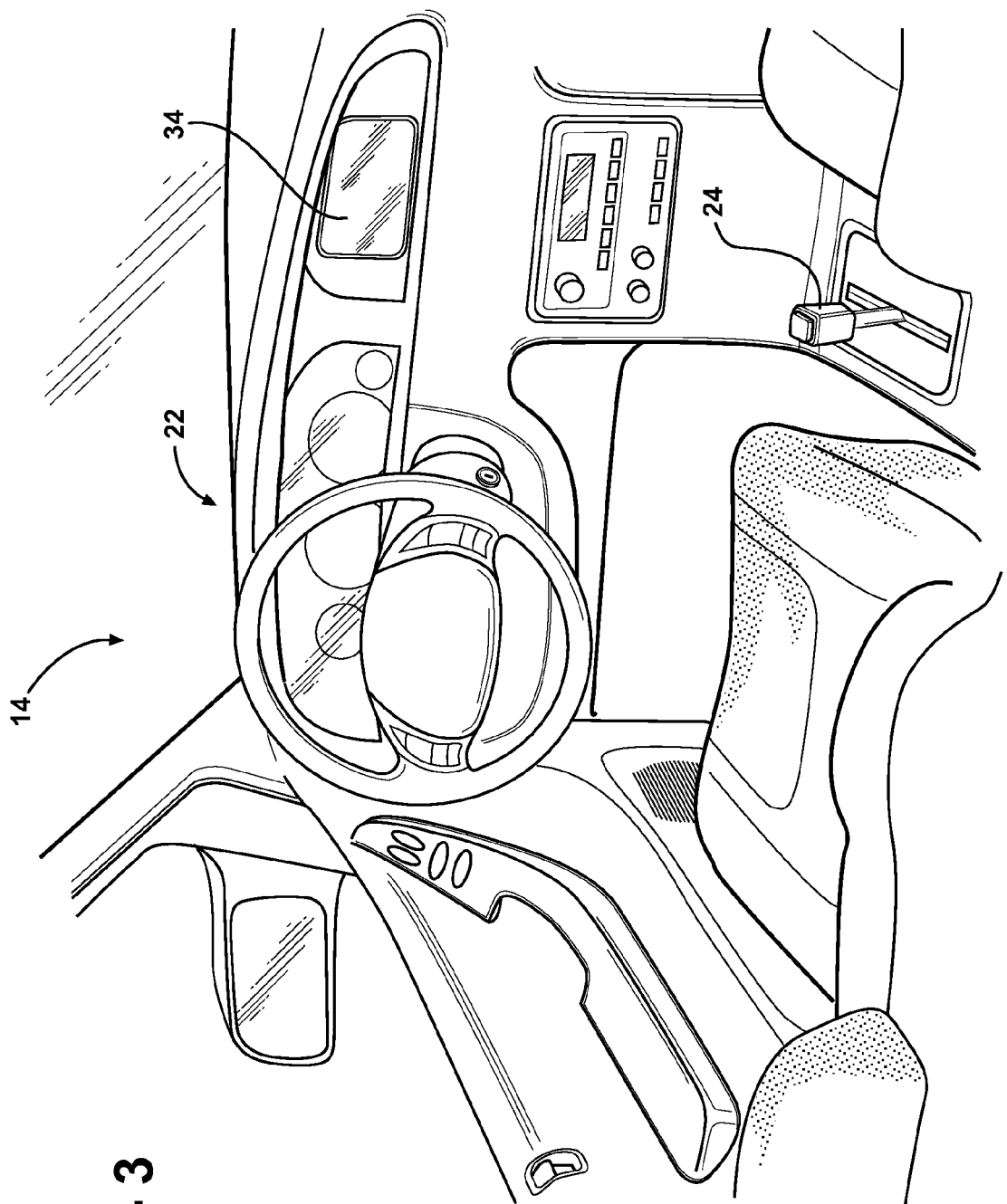
FIG. 3 is a perspective view of the driver's console of the vehicle showing a transmission selector device mounted on a steering column and the display.
Figure 4:
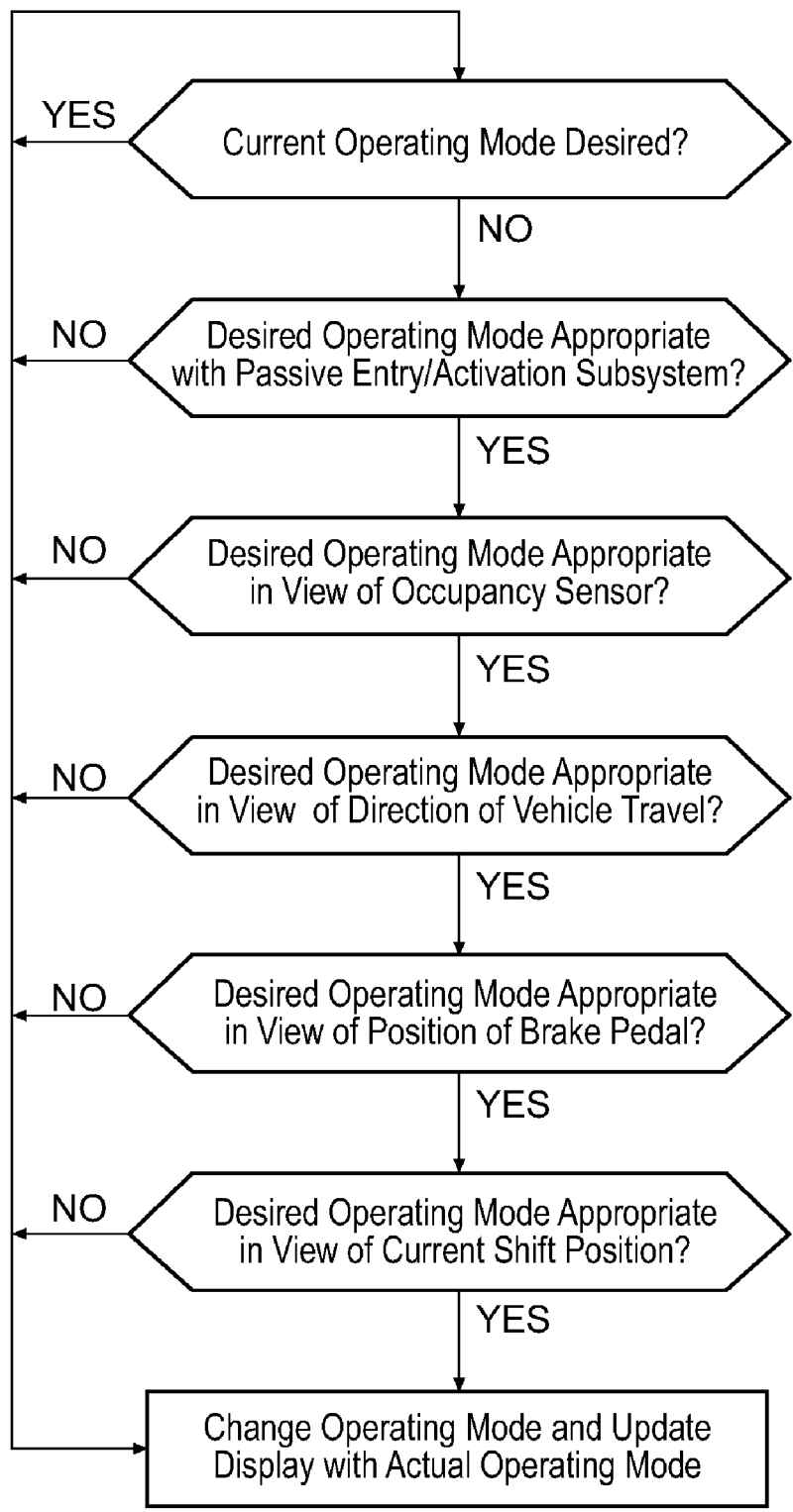
FIG. 4 is a flowchart showing an example of an algorithm utilized in the present invention.

Referring to FIGS. 1-3, the vehicle 14 preferably includes a driver's console 22 providing various controls allowing the driver to manipulate the vehicle 14. These controls (not numbered) typically include, but are certainly not limited to, a steering wheel supported by a steering column, an accelerator pedal, a brake pedal, a turn signal lever, a windshield wiper switch, and cruise control pushbuttons. The driver's console 22 also includes various driver feedback devices. These devices (not numbered) may include, but are not limited to, a speedometer, a tachometer, and various status lights.

The system 10 of the present invention includes a transmission selector device 24 for receiving an input from the driver corresponding to a desired operating mode of the transmission 12. The transmission selector device 24 is preferably included as one of the controls of the driver's console 22. In one embodiment, shown in FIG. 3, the transmission selector device 24 may be implemented as a lever movable through a plurality of positions with each position corresponding to one of the operating modes and/or operating gears. The lever may be supported on the steering column or other positions of the vehicle 14, as is known to those skilled in the art. In another embodiment, shown in FIG. 2, the transmission selector device 24 may be implemented as a rotatable knob. The rotatable knob may be supported by a dashboard of the vehicle 14. Of course, those skilled in the art realize other suitable positions for the rotatable knob. In yet another embodiment, the transmission selector device 24 may be implemented as a plurality of pushbuttons. Those skilled in the art realize other suitable implementations of the transmission selector device 24. Referring again to FIG. 1, the transmission selector device 24 is electrically connected to one of the inputs of the controller 16. Therefore, the transmission selector device 24 is in communication with the controller 16.

The system 10 also preferably includes an occupancy sensor 26 for sensing the presence of the driver in a driver's seat of the vehicle 14. In one embodiment, the occupancy sensor 26 is a weight or pressure sensor operatively connected to the driver's seat. In another embodiment, the occupancy sensor 26 is implemented as an optical sensor directed toward the driver's seat to sense the presence of the driver. Those skilled in the art realize other techniques for implementing the occupancy sensor 26.

The occupancy sensor 26 is electrically connected to one of the inputs of the controller 16. Said another way, the occupancy sensor 26 is in communication with the controller 16. The occupancy sensor 26 sends an occupancy sensor signal to the controller 16. The occupancy sensor signal indicates the presence or lack of presence of the driver in the driver's seat.

In the preferred embodiment, the controller 16 implements a software program to control the operational mode (and thus the gear selection) of the transmission 12 in response to a variety of inputs. The software program is responsive to a plurality of inputs to the controller 16 and responds with output to the shifter motor 20 to change the operational mode and/or gear selection of the transmission 12. The controller 16, in essence, sends an appropriate operating mode of the transmission 12 to the shifter motor 20 and, thus, to the transmission 12.

One function of the software program is to determine whether or not it is appropriate to change the operational mode and/or gear selection of the transmission 12 to the desired operational mode selected using the transmission selector device 24. One factor in determining whether or not it is appropriate to change the operational mode and/or gear selection of the transmission 12 is whether or not the driver's seat is occupied. Specifically, in the preferred embodiment, the software program implemented in the controller 16 prohibits shifting from the park operating mode to any other operating mode unless the driver's seat is occupied.

The software program may be configured to be response to other inputs to the controller 16. For instance, the controller 16 is preferably in communication with a variety of other vehicle 14 subsystems and devices. A passive entry/activation subsystem 28 determines whether an individual attempting to open or start the vehicle 14 is authorized to enter or operate the vehicle 14. This is accomplished by sensing a radio frequency identification (RFID) card, key fob, or similar object possessed by the authorized individual. If the RFID card or key fob is not sensed, then the passive entry/activation subsystem will not provide the correct signal to the controller 16. Accordingly, the software program of the controller 16 will not allow the transmission 12 to shift out of the park operating mode unless the RFID card or key fob is sensed.

The vehicle 14 also preferably includes an absolute position sensor 30 in communication with the controller 16. The absolute position sensor 30 may be implemented as a global positioning system (GPS) receiver which provides GPS data, such as the position, speed, and/or direction of the vehicle 14. The GPS data is communicated to the controller 16 from the GPS receiver such that the controller 16 may determine if shifting the operating mode is appropriate based on the direction of the vehicle 14 travel and/or the speed of the vehicle 14.

For example, if the GPS data shows the vehicle 14 moving in a forward direction, the controller 16 may prohibit shifting into the reverse operating mode to prevent damage to the transmission 12. As another example, if the vehicle 14 is moving at a high rate of speed, e.g. 60 miles per hour, the controller 16 may prohibit the transmission 12 from shifting into a park or reverse operating mode or a low transmission gear.

The system 10 may also include a brake pedal switch 38 for sensing the position of the brake pedal (not shown). The brake pedal switch 38 is in communication with the controller 16 to send a brake position signal to the controller 16 corresponding to the position of the brake pedal. The software program of the controller 16 may utilize the position of the brake pedal in deciding whether to allow the transmission 12 to shift from the park operating mode to one of the other operating modes.

One example of an algorithm utilized by the software program is illustrated in FIG. 3. The algorithm includes a series of decision making steps utilized in determining whether to change the operating mode of the transmission 12. Of course, those skilled in the art may realize other suitable modifications to the algorithm based on the configuration of the vehicle 14.

The system may also include a park switch 36. The park switch 36 is in communication with the controller 16. The park switch 36 is activated by the driver to place the transmission 12 in the park operating mode. The park switch 36 may also serve to activate a parking brake (not numbered) which is not typically part of the transmission 12.

The preferred embodiment of the system 10 includes a transmission sensor 30 for sensing the actual operating mode and gear selection of the transmission 12. This transmission sensor 30 may be operatively connected to the transmission 12, the shifter motor 20, or other mechanism as realized by those skilled in the art. Preferably, the transmission sensor 30 is electrically connected to and in communication with the controller 16.

Referring to FIGS. 2 and 3, the system 10 also includes a display 34 for displaying information to the driver and/or other occupants of the vehicle 14. The display 34 is preferably part of the driver's console 22 and in communication with the controller 16. The display 34 may be implemented with any of a variety of technologies. For example, the display 34 could be a color LCD unit with a dedicated microprocessor. Alternatively, the display 34 could comprise a plurality of light-emitting diodes (LEDs). Those skilled in the art realize a vast number of techniques to implement the display. Furthermore, those skilled in the art realize that the vehicle 14 may include a plurality of displays 34.

Figure 5:
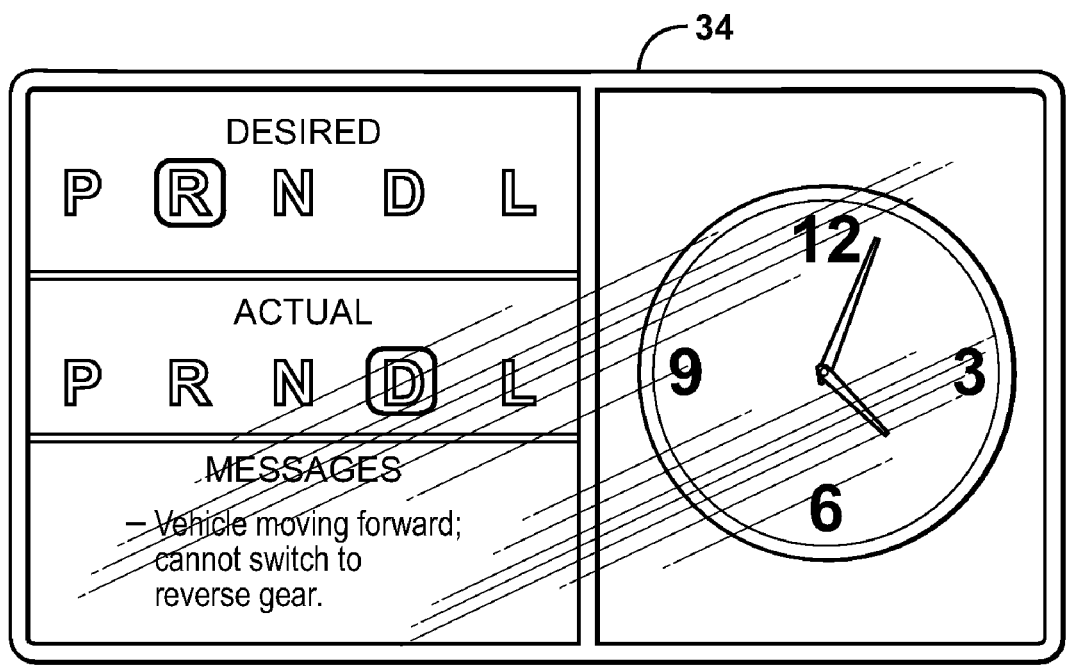
FIG. 5 is a front view of the display showing desired and actual operating modes of a transmission of the vehicle.

In one embodiment, shown in FIG. 5, the display 34 displays both the desired operating mode and/or gear selection of the transmission 12, as selected with the transmission selector device 24, and the actual operating mode and/or gear selection of the transmission 12. More specifically, the display preferably displays both the desired and actual operating modes simultaneously. As stated above, the actual operating mode and/or gear selection of the transmission 12 may be sensed by the transmission sensor 30, such that the actual operating mode relates to the physical operation of the transmission 12 and not necessarily an electrically output of the controller 16.

By simultaneously displaying both the desired and actual operating mode and/or gear selection of the transmission 12, the driver of the vehicle 14 is able to see if and when the transmission 12 has actually changed operating mode and/or gears. Thus, the driver is not led to believe that the vehicle 14 is operating in the desired operating mode merely because that operating mode was selected.

The display 34 may also provide other informational messages to the driver concerning the operating mode of the transmission 12. In one embodiment, the display 34 may describe the discrepancy between the actual operating mode of the transmission 12 and the desired operating mode of the transmission 12. For example, the display 12 may show the message, "SPEED TOO FAST FOR FIRST GEAR" in response to the transmission selector device 24 being switched to first gear operation while the vehicle is traveling at high rate of speed, e.g., 70 miles per hour.

In one embodiment, the display 34 and the transmission selector device are integrated together as an input and display unit (not shown). One possible configuration for the input and display unit is a touchscreen display 34 having a touchscreen layer over the display to receive the selection of the desired operating mode of the transmission from the driver The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of relaying transmission information to a driver of a vehicle, said method comprising the steps of:
   receiving an input from a driver corresponding to a desired operating mode of the transmission;
   sensing an actual operating mode of the transmission; and
   displaying both the desired operating mode and actual operating mode of the transmission to the driver of the vehicle.

2. A method as set forth in claim 1 wherein said step of displaying both the desired operating mode and actual operating mode is further defined as simultaneously displaying both the desired operating mode and actual operating mode of the transmission to the driver of the vehicle.

3. A method as set forth in claim 1 further including a display and further comprising the steps of generating and displaying a message associated on the display associated with a discrepancy between the desired operating mode and the actual operating mode.

4. A system for operating a transmission of a vehicle, said system comprising:
   a transmission selector device for receiving an input from a driver corresponding to a desired operating mode of the transmission;
   a sensor operatively connected to the transmission for sensing an actual operating mode of the transmission; and
   a display in communication with said transmission selector device and said sensor for displaying both the desired operating mode and the actual operating mode of the transmission to the driver.

5. A system as set forth in claim 4 further comprising a controller including at least one input electrically connected to said transmission selector device for receiving an input signal corresponding to the desired operating mode of the transmission and electrically connected to said sensor for receiving a sensor signal corresponding to the actual operating mode of the transmission.

6. A system as set forth in claim 5 wherein said controller further includes at least one output electrically connected to said display for sending a display signal encoding the desired operating mode and actual operating mode of the transmission to said display.

7. A system as set forth in claim 4 wherein said display and said transmission selector device are integrated together as an input and display unit.

8. A system as set forth in claim 4 wherein said display simultaneously displays both the desired operating mode and the actual operating mode of the transmission to the driver.

9. A system for controlling an operating mode of a transmission of a vehicle, the transmission including a plurality of operating modes including a park mode and at least one drive mode, said system comprising:
   a transmission selector device for receiving an input from a driver corresponding to a desired operating mode of the transmission;
   an occupancy sensor operatively connected to a driver's seat of the vehicle for sensing a presence of a driver in the driver's seat;
   a controller including at least one input electrically connected to said transmission selector device and said sensor for receiving a selection signal from said transmission selector device corresponding to the desired operating mode of the transmission and a occupancy sensor signal from said occupancy sensor corresponding to the presence of the driver in the driver's seat;
   said controller determining an appropriate operating mode of the transmission based at least in part on the selection signal and the occupancy sensor signal; and
   said controller also including at least one output electrically connected to the transmission for sending an output signal corresponding to the appropriate operating mode of the transmission determined by said controller.

10. A system as set forth in claim 9 further comprising a transmission sensor for sensing the actual operating mode of the transmission.

11. A system as set forth in claim 10 further comprising a display in communication with said transmission selector device and said transmission sensor for displaying both the desired operating mode and the actual operating mode of the transmission to the driver.

12. A system as set forth in claim 11 wherein said display simultaneously displays both the desired operating mode and the actual operating mode of the transmission to the driver.

13. A method of controlling an operating mode of a transmission of a vehicle, the transmission including a plurality of operating modes including a park mode and at least one drive mode, said method comprising the steps of:
   receiving an input from a driver of the vehicle corresponding to a desired operating mode of the transmission;
   sensing the presence of a driver in a driver's seat of the vehicle;
   determining an appropriate operating mode of the transmission based at least in part on both the input from the driver and the presence of the driver in the driver's seat; and
   sending the appropriate operating mode of the transmission to the transmission.

14. A method as set forth in claim 13 wherein said step of determining the appropriate operating mode includes the steps of setting the appropriate operating mode to the park mode if the driver is not present in the driver's seat and setting the appropriate operating mode to the desired operating mode if the driver is present in the driver's seat.

15. A method as set forth in claim 13 further comprising the step of sensing an actual operating mode of the transmission.

16. A method as set forth in claim 15 further comprising the step of displaying both the desired operating mode and actual operating mode of the transmission to the driver of the vehicle.

17. A method as set forth in claim 15 wherein said step of displaying both the desired operating mode and actual operating mode is further defined as simultaneously displaying both the desired operating mode and actual operating mode of the transmission to the driver of the vehicle.

* * * * *